No. 876,722. PATENTED JAN. 14, 1908.
J. H. KROEN.
TROLLEY.
APPLICATION FILED JULY 23, 1906.

Witnesses
Samuel Payne
L. H. Butler

Inventor
J. H. Kroen
by
Attorneys

UNITED STATES PATENT OFFICE.

JOSEPH H. KROEN, OF MONACA, PENNSYLVANIA.

TROLLEY.

No. 876,722.  Specification of Letters Patent.  Patented Jan. 14, 1908.

Application filed July 23, 1906. Serial No. 327,359.

*To all whom it may concern:*

Be it known that I, JOSEPH H. KROEN, a citizen of the United States of America, residing at Monaca, in the county of Beaver and State of Pennsylvania, have invented certain new and useful Improvements in Trolleys, of which the following is a specification, reference being had therein to the accompanying drawing.

This invention relates to trolley guards, and its object is to provide a device of this character which will prevent the accidental disengagement of the trolley from its conductor wire, but permit the trolley to be readily removed by the manipulation of a pull-rope and replaced by the same means.

The construction of the improvement will be fully described hereinafter, in connection with the accompanying drawing which forms part of this specification and its novel features will be defined in the appended claims.

Figure 1:
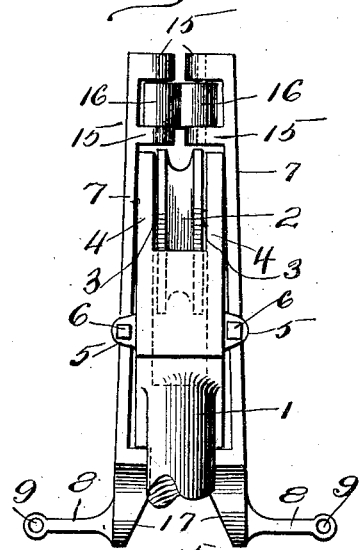
Figure 2:
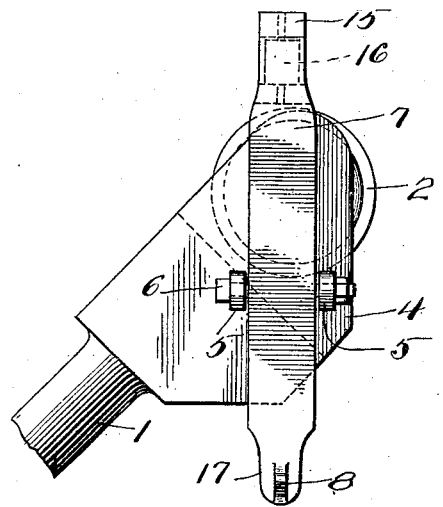
Figure 3:
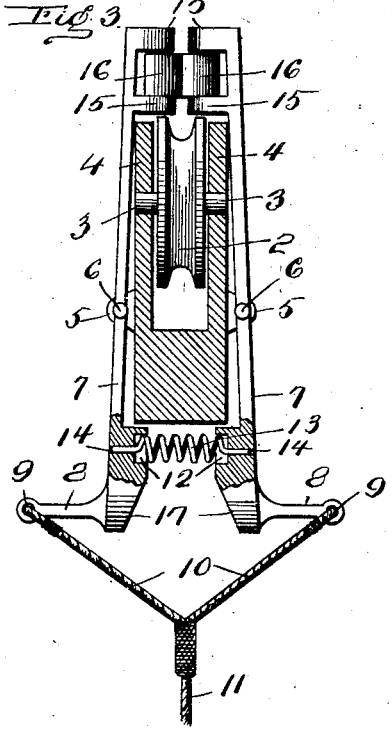
Figure 4:
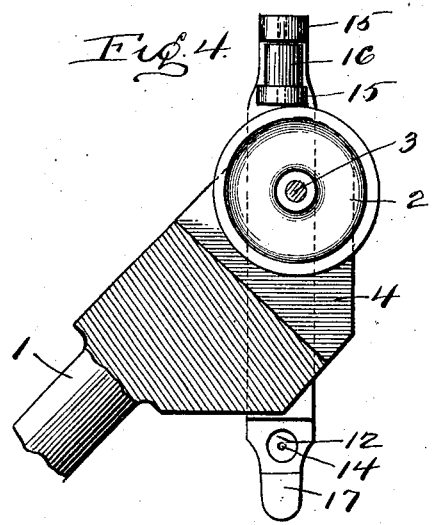
Figure 5:
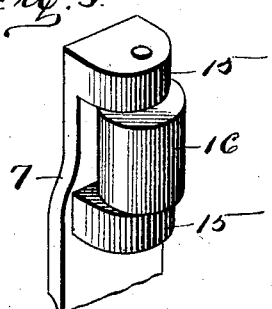

In the drawing, Figure 1 is a front elevation of a trolley pole and trolley equipped with my improvement, Fig. 2 is a side elevation of the same, Fig. 3 is a transverse vertical section of the same, Fig. 4 is a longitudinal vertical section, and Fig. 5 is a detail perspective view of one of the guard arms with its anti-friction roller.

The reference numeral 1 designates a trolley-pole bifurcated at its upper end to accommodate the trolley wheel 2 mounted upon an axial support 3 mounted in bearings formed in the parallel sides 4 of the trolley harp as shown.

Projecting from each side of the harp are parallel ears 5, perforated to receive bolts 6, upon each of which is pivotally supported a guard member 7.

The guard members depend below the upper end of the pole on opposite sides thereof, and from the outer side of the lower end of each projects an arm 8 formed with eyes 9 at their outer ends for the attachment of ropes 10, said ropes being connected to a pull rope 11.

The lower ends of the guard members 7 are increased in thickness, and recessed on their inner faces as at 12 to receive a coil spring 13 the ends 14 of which are secured in openings formed in the guard members.

On the inner face of each of the pivoted guard members adjacent to its upper end are arranged parallel projecting perforated lugs 15, between which is mounted an anti-friction roller 16, said rollers normally resting in contact with each other with the lower lugs 15 of the two members overhanging the trolley wheel as clearly shown in the drawings, thus preventing the trolley wheel from leaving the wire accidentally. When it is desired to disengage the trolley from the wire a pull upon the ropes 11 and 10 forces the lower ends of the guard members together, the meeting faces 17 of said ends being oppositely beveled for that purpose. The inward movement of the lower ends of the two pivoted guard members compresses the spring 13 and when the pull rope is released, said spring, as is obvious, restores the guard members to their normal position with their anti-friction rollers in contact with each other.

The utility and operation of the improvement will be apparent without further explanation and the device provides a simple and easily manipulated device for the purpose in view.

What I claim and desire to secure by Letters Patent, is:—

The combination with a trolley pole terminating at its upper end in a harp extending at an inclination and a trolley wheel journaled in said harp, said harp having each of its side faces provided with a pair of lugs, one of the lugs of each pair of lugs arranged in proximity to the vertical edge of its respective face and the other lug of said pair positioned at one side of the center of its respective face, the lugs of each pair arranged in parallelism with respect to each other, of a guard comprising a pair of arms extending in a vertical direction with respect to the harp, said arms extending between said lugs and each of which has its upper end formed with a pair of inwardly-extending protuberances, one of the protuberances of each pair arranged over the other protuberance of the pair, and each of said protuberances provided in close proximity to its free end with an opening, bolts extending through the lugs for pivotally-connecting the arms thereto, vertically-extending friction rollers positioned between the said pairs of protuberances, said rollers abutting, means extending through the openings of the protuberances for connecting the rollers to the arms, each of said arms furthermore provided with an inwardly-extending portion at its lower end, the top of said inwardly-extending portions arranged in close proximity to the lower face of the harp, each of said inwardly-extending portions provided with a recess, a laterally-extending apertured arm formed integral with the outer face of each of the arms at the lower end thereof, a spring interposed between the inwardly-extending portions of the arms engaging in said recesses and having the ends extending in the arms, and a trolley rope attached to the apertured arms.

In testimony whereof I affix my signature in the presence of two witnesses.

JOSEPH H. KROEN.

Witnesses:
   MAX H. SCROLOVITZ,
   E. E. POTTER.